H. W. DOPP.
Nut-Locks.
No. 142,215. Patented August 26, 1873.
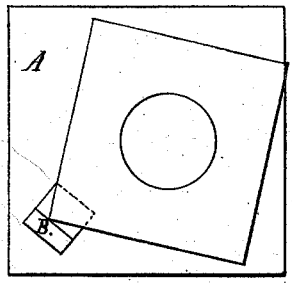 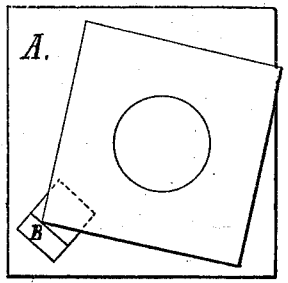
  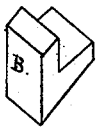 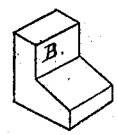
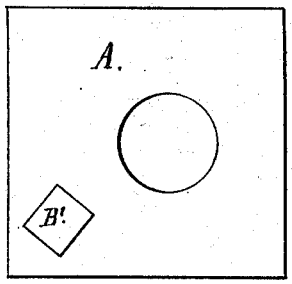 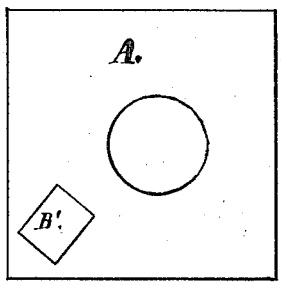
WITNESSES,
Henry Barthy
A. T. Dopp
INVENTOR,
H. William Dopp

UNITED STATES PATENT OFFICE.

H. WILLIAM DOPP, OF BUFFALO, ASSIGNOR OF TWO-THIRDS HIS RIGHT TO FERNANDO C. CANDEE, OF NEW YORK, N. Y.

IMPROVEMENT IN NUT-LOCKS.

Specification forming part of Letters Patent No. 142,215, dated August 26, 1873; application filed January 8, 1873.

*To all whom it may concern:*

Be it known that I, H. WILLIAM DOPP, of the city of Buffalo, in the county of Erie and State of New York, have invented certain Improvements in Lock-Washers, of which the following is a specification:

The nature of my invention consists in the construction of a lock-washer so arranged that the same may be produced of wrought-iron, ready punched. The lock-washer consists of two parts—a plate having two holes, one in about the center for the bolt to pass through, and one on the side for the reception of a post with a foot. After the bolt is passed through the washer and the nut screwed up the post or projection is inserted into the hole or slot on the side of the plate and partly covered by the nut. Said post or projection is so shaped that if the nut is slightly turned back on the foot it will prevent the post from coming out and the nut from unscrewing. I refer to the annexed drawing, which makes part of this specification, and in which—

A represents the washer-plate, provided with two holes—one in about the center for the passage of the bolt, while the outer hole is to receive the lock-post B. This post or projection B is to be inserted after the bolt passing through the center-hole is fastened by means of a nut. B represents the nut-locking post, which, when inserted into the hole or slot B', projects out of the same in order to prevent the nut from unscrewing. It is so shaped that when in its place the nut can pass partly over the foot so as to prevent it from coming out of its place, but still projecting sufficiently above A to answer the purpose already stated.

Be it observed that B may be of any form or shape, with the foot in a wedging shape, as illustrated in the figures of the drawing.

The object of my invention is to produce a reliable, durable, and cheap wrought-iron lock-washer to prevent nuts from turning off.

Having thus fully described my invention, I claim and desire to secure by Letters Patent the following:

In a nut-locking device the combination of a nut-washer with a post, B, constructed as described, and inserted in a hole of said washer after the nut is screwed up, and secured in place by a slight backward movement of the nut, substantially as described, and for the purpose set forth.

H. WILLIAM DOPP.

Witnesses:
 HENRY BALTHIG,
 A. F. DOPP.